US010781279B2

(12) United States Patent
Laskowski et al.

(10) Patent No.: US 10,781,279 B2
(45) Date of Patent: Sep. 22, 2020

(54) PENTABLOCK COPOLYMERS

(71) Applicant: 3M INNOVATIVE PROPERTIES COMPANY, St. Paul, MN (US)

(72) Inventors: Carl A. Laskowski, Minneapolis, MN (US); Timothy M. Gillard, St. Paul, MN (US); Michelle M. Mok, St. Paul, MN (US); Lucas D. McIntosh, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/341,561

(22) PCT Filed: Nov. 17, 2017

(86) PCT No.: PCT/US2017/062138
§ 371 (c)(1),
(2) Date: Apr. 12, 2019

(87) PCT Pub. No.: WO2018/098023
PCT Pub. Date: May 31, 2018

(65) Prior Publication Data
US 2019/0322788 A1 Oct. 24, 2019

Related U.S. Application Data

(60) Provisional application No. 62/425,352, filed on Nov. 22, 2016.

(51) Int. Cl.
C08F 297/04 (2006.01)
C08G 63/08 (2006.01)
C08G 65/08 (2006.01)
C08G 77/04 (2006.01)
C08L 9/00 (2006.01)
C08L 53/02 (2006.01)
C08L 87/00 (2006.01)

(52) U.S. Cl.
CPC .......... C08F 297/044 (2013.01); C08G 63/08 (2013.01); C08G 65/08 (2013.01); C08G 77/04 (2013.01); C08L 9/00 (2013.01); C08L 53/025 (2013.01); C08L 87/005 (2013.01); C08L 2203/12 (2013.01); C08L 2203/16 (2013.01); C08L 2205/02 (2013.01); C08L 2205/03 (2013.01); C08L 2205/05 (2013.01)

(58) Field of Classification Search
CPC .... C08F 8/14; C08F 297/048; C08F 297/046; C08F 297/044; C08F 297/042; C08F 297/04
See application file for complete search history.

(56) References Cited

U.S. PATENT DOCUMENTS

| 3,133,132 A | 5/1964 | Loeb |
| 3,283,042 A | 11/1966 | Loeb |
| RE27,145 E | 6/1971 | Jones |
| 3,971,373 A | 7/1976 | Braun |
| 4,039,593 A | 8/1977 | Kamienski |
| 4,100,324 A | 7/1978 | Anderson |
| 4,258,144 A | 3/1981 | Childers |
| 4,429,001 A | 1/1984 | Kolpin |
| 5,145,727 A | 9/1992 | Potts |
| 5,149,576 A | 9/1992 | Potts |
| 5,321,148 A | 6/1994 | Schwindeman |
| 5,750,055 A | 5/1998 | Van Der Steen |
| 6,160,054 A | 12/2000 | Schwindeman |
| 6,184,338 B1 | 2/2001 | Schwindeman |
| 6,197,891 B1 | 3/2001 | Schwindeman |
| 6,221,991 B1 | 4/2001 | Letchford |
| 6,492,469 B2 | 12/2002 | Willis |
| 7,884,160 B2 | 2/2011 | Wang |
| 8,652,631 B2 | 2/2014 | Zoller |
| 9,527,041 B2 | 12/2016 | Wiesner |
| 9,592,477 B2 | 3/2017 | Aamer |
| 9,914,099 B2 | 3/2018 | Peinemann |
| 2009/0173694 A1 | 7/2009 | Peinemann |
| 2011/0189463 A1 | 8/2011 | Moore |
| 2012/0318741 A1 | 12/2012 | Peinemann |
| 2013/0015071 A1 | 1/2013 | Willis |
| 2013/0190408 A1 | 7/2013 | Scholz |
| 2014/0217012 A1 | 8/2014 | Wiesner |
| 2015/0151256 A1 | 6/2015 | Abetz |
| 2015/0217237 A1 | 8/2015 | Abetz |
| 2015/0343395 A1 | 12/2015 | Aamer |
| 2015/0343396 A1 | 12/2015 | Aamer |
| 2015/0344639 A1 | 12/2015 | Aamer |
| 2016/0023171 A1 | 1/2016 | Phillip |

FOREIGN PATENT DOCUMENTS

| CA | 2886437 | 5/2014 |
| CN | 103861480 | 6/2014 |
| DE | 102012207338 | 11/2013 |

(Continued)

OTHER PUBLICATIONS

Meuler Thesis (Year: 2009).*
Bandrup et al. The Polymer Handbook, Fourth edition (Year: 1999).*
Cohen, "Cobalt Catalysts for the Alternating Copolymerization of Propylene Oxide and Carbon Dioxide: Combining High Activity and Selectivity", Journal of the American Chemical Society, Aug. 2005, vol. 127, No. 31, pp. 10869-10878.
Frey, "Hyperbranched Molecular Nanocapsules: Comparison of the Hyperbranched, Architecture with the Perfect Linear Analogue," Journal of the American Chemical Society, Jul. 2002, vol. 124, No. 33, pp. 9698-9699.

(Continued)

Primary Examiner — Mark S Kaucher

(57) ABSTRACT

Novel pentablock polymers of the formula ABCBA are provided wherein C is a glassy aromatic block having a Tg of >70° C.; B is a rubber block having a Tg<25° C.; and A is a block incompatible with the B and C blocks and derived from ring-opening polymerization of cyclic monomers.

17 Claims, 2 Drawing Sheets

(56) References Cited

FOREIGN PATENT DOCUMENTS

| DE | 102012207344 | 11/2013 |
|---|---|---|
| DE | 102014213027 | 1/2016 |
| GB | 2147586 | 5/1985 |
| WO | WO 1996-011238 | 4/1996 |
| WO | WO 2014-079538 | 5/2014 |
| WO | WO 2015-052579 | 4/2015 |
| WO | WO 2018-097988 | 5/2018 |

OTHER PUBLICATIONS

Greene, Protective Groups in Organic Synthesis, Second Edition, 41, (1991).

Greene, Protective Groups in Organic Synthesis, Second Edition, 80-83, (1991).

Hahn, "Structure Formation of Integral-Asymmetric Membranes of Polystyrene-block-Poly (ethylene oxide)", Journal of Polymer Science Part B: Polymer Physics, Jan. 2013, vol. 51, No. 4, pp. 281-290.

Hanley, "Phase Behavior of a Block Copolymer in Solvents of Varying Selectivity," Macromolecules, 2000, vol. 33, No. 16, pp. 5918-5931.

Hsieh, Anionic Polymerization: Principles and Practical Applications, 93-127 (1996).

Hsieh, Anionic Polymerization: Principles and Practical Applications, 641-684 (1996).

Jeske, "Alternating Copolymerization of Epoxides and Cyclic Anhydrides: An Improved Route to Aliphatic Polyesters", Journal of the American Chemical Society, Sep. 2007, vol. 129, No. 37, pp. 11330-11331.

Jung, "Formation of Integral Asymmetric Membranes of AB Diblock and ABC Triblock Copolymers by Phase Inversion", Macromolecular Rapid Communications, Apr. 2013, vol. 34, No. 7, pp. 610-615.

Karunakaran, "Isoporous PS-b-PEO Ultrafiltration Membranes via Self-Assembly and Water-Induced Phase Separation", Journal of Membrane Science, Mar. 2014, vol. 453, pp. 471-477.

Kawakami, "Silicone Macromers for Graft Polymer Synthesis", Polymer Journal, Nov. 1982, vol. 14, No. 11, pp. 913-917.

Kawakami, "Synthesis and Copolymerization of Polysiloxane Macromers", ACS Polymer Preprints, Apr. 1984, vol. 25, No. 1, pp. 245-246.

Kawakami, "Synthesis of Silicone Graft Polymers and a Study of Their Surface-Active Properties", Macromolecular Chemistry and Physics, Jan. 1984, vol. 185, No. 1, pp. 9-18.

Koetsier, "Block Copolymers of Styrene, Isoprene, and Ethylene Oxide Prepared by Anionic Polymerization. I. Synthesis and Characterization," Journal of Polymer Science: Polymer Chemistry Edition, 1978, vol. 16, pp. 511-521.

Li, "Morphology and Wettability Control of Honeycomb Porous Films of Amphiphilic Fluorinated Pentablock Copolymers via Breath Figure Method", RSC Advances, Sep. 2014, vol. 4, No. 91, pp. 49655-49662.

Liu, "Fabrication of a Novel PS4VP/PVDF Dual-Layer Hollow Fiber Ultrafiltration Membrane", Journal of Membrane Science, May 2016, vol. 506, pp. 1-10.

Meuler, "Structure and Mechanical Properties of an $O^{70}$ (Fddd) Network-Forming Pentablock Terpolymer," Macromolecules, 2008, vol. 41, No. 15, pp. 5809-5817.

Mogi, "Preparation and Morphology of Triblock Copolymers of the ABC Type", Macromolecules, Feb. 1992, vol. 25, No. 20 pp. 5408-5411.

Ndoni, "Laboratory-Scale Setup for Anionic Polymerization under Inert Atmosphere", Review of Scientific Instruments, Feb. 1995, vol. 66, No. 2, pp. 1090-1095.

Noor, A Facile Method to Prepare Double-Layer Isoporous Hollow Fiber Membrane by In Situ Hydrogen Bond Formation in the Spinning Line, Macromolecular Rapid Communications, Mar. 2016, vol. 37, No. 5, pp. 414-419.

Patel, "Novel Thermosensitive Pentablock Copolymers for Sustained Delivery of Proteins in the Treatment of Posterior Segment Diseases", Protein and Peptide Letters, 2014, vol. 21, No. 11, pp. 1185-1200.

Phillip, "Tuning Structure and Properties of Graded Triblock Terpolymer-Based Mesoporous and Hybrid Films," Nano Letters, Jun. 2011, vol. 11, No. 7, pp. 2892-2900.

Su, "Ring-Opening Polymerization". In: Principles of Polymer Design and Synthesis. Lecture Notes in Chemistry, 2013, vol. 82, Springer Berlin Heidelberg, pp. 267-299.

Thong, "Novel Nanofiltration Membranes Consisting of a Sulfonated Pentablock Copolymer Rejection Layer for Heavy Metal Removal", Environmental Science & Technology, Nov. 2014, vol. 48, No. 23, pp. 13880-13887.

Wente, "Manufacture of Super Fine Organic Fibers," Report No. 4364 of the Naval Research Laboratories, May 1954.

Wente, "Superfine Thermoplastic Fibers," Industrial Engineering Chemistry, 1956, vol. 48, pp. 1342-1346.

Xie, "Poly(dimethylsiloxane)-Based Polyurethane with Chemically Attached Antifoulants for Durable Marine Antibiofouling", ACS Applied Materials Interfaces, Sep. 2015, vol. 7, No. 38, pp. 21030-21037.

Zhang, "Nanomanufacturing of High-Performance Hollow Fiber Nanofiltration Membranes by Coating Uniform Block Polymer Films from Solution", Journal of Materials Chemistry A, Jan. 2017, vol. 5, No. 7, pp. 3358-3370.

Zhang, "Nanoporous Membranes Generated from Self-Assembled Block Polymer Precursors: Quo Vadis?", Journal of Applied Polymer Science, Jun. 2015, vol. 132, No. 21, 17 pages.

International Search Report for PCT International Application No. PCT/US2017/061496, dated Feb. 23, 2018, 5 pages.

International Search Report for PCT International Application No. PCT/US2017/062138, dated Mar. 9, 2018, 4 pages.

* cited by examiner

PENTABLOCK COPOLYMERS

CROSS REFERENCE TO RELATED APPLICATIONS

This application is a national stage filing under 35 U.S.C. 371 of PCT/US2017/062138, filed Nov. 17, 2017, which claims the benefit of U.S. Application No. 62/425,352, filed Nov. 22, 2016, the disclosure of which is incorporated by reference in its/their entirety herein.

BACKGROUND

Materials possessing features with length scales on the order of 10-200 nm are of interest due to their potential impact in lithography, charge-carrying membranes and filtration. Block copolymers—polymers which contain discrete monomer domains have been shown to be capable of self-assembling to yield materials with these desirable features. Spherical, cylindrical, lamellar and gyroid morphologies may be obtained from block copolymers with differences in self-assembly dependent on total molecular weight, block composition, degree of polymerization of the individual blocks, and annealing procedures.

Block copolymers have been investigated for applications involving incompatible interfaces. These include use in primers and tie-layers in multilayer films. Their potential benefit lies in the ability of block copolymers to form a covalently-bound junction between two otherwise immiscible surfaces. In commercial applications, block copolymer primers are most commonly segmented-block copolymers prepared from condensation polymerization methodologies. Similarly, block copolymers may be used as dispersants as a more polar, functionalized block can interact with inorganic particles while a non-polar block serves to solubilize the composite material.

Blending of block copolymers into other polymeric compositions can result in improved properties of the final material. This technique has been used for toughening of otherwise brittle coatings, such as impact modifiers for epoxy resins. Additional bulk characteristics that can be influenced through the use of block copolymers include modification of rheology and use as compatibilizers.

In addition to application in the bulk, block copolymers have found use in solution-based processes. Amphiphilic block copolymers readily form micelle structures in select solvents, where the identity of the polymer and solvent play a crucial role in determining the structure formed (as in Bates et. al, Macromolecules, 2000, 33, 5918). Micelle formation can be exploited for such applications as drug delivery where the micelles are "loaded" with small molecule therapeutics. Solution reaction vessels may also be constructed from select block copolymers for purposes such as emulsion polymerization. Crosslinking of solution-derived micelles can be accomplished chemically or photolytically to afford polymeric nanoparticles.

Filtration materials based on block copolymers are of particular interest. Recently, the combination of solvent induced phase separation (SIPS) with block copolymer materials has been shown to yield membranes with unique isoporous morphologies and consequent high flux. Previously described isoporous membranes have been formed from diblock poly(styrene-b-vinylpyridine) (SV) and triblock poly(isoprene-styrene-vinylpyridine) (ISV) copolymers. These materials have enjoyed success due to their ability to (1) form micelles with a diameter of 10 s of nm, (2) their solubility characteristics in a handful of water-miscible solvents, and (3) their ability to be synthesized in a straightforward fashion through anionic polymerization. However, the use of SV and ISV in the commercial production of a filtration membrane is highly unlikely due to a number of factors. The brittle nature of the cast membranes limits their tolerance to bending and handling. Additionally, their synthesis requires the use of temperatures below −70° C., making scale-up exceptionally challenging.

SUMMARY

Novel pentablock polymers of the formula ABCBA are provided wherein B is a glassy aromatic block having a $T_g$ of >70° C.; C is a rubber block having a $T_g$<25° C.; and A is a block incompatible with the B and C blocks. The pentablock copolymers have a $M_n$>60 kDa and is preferably 60-500 kDa. These polymers display a unique combination of solution self-assembly and film mechanical toughness. Specifically, in solution they can form micelles greater than 30 nm and when formed into films (or particles) they display significant improvements in toughness and tensile strength relative to triblock copolymer materials of similar composition and total molecular weight.

Methods of preparing the pentablock copolymers are described in which the B monomers are anionically polymerized followed by the C monomers, then the non-compatible A blocks are added by ring-opening polymerization from a telechelic hydroxyl-terminated BCB triblock copolymer.

This invention also relates to polymer compositions comprising the pentablock copolymer and shaped articles made therefrom.

DETAILED DESCRIPTION

Figure 1:
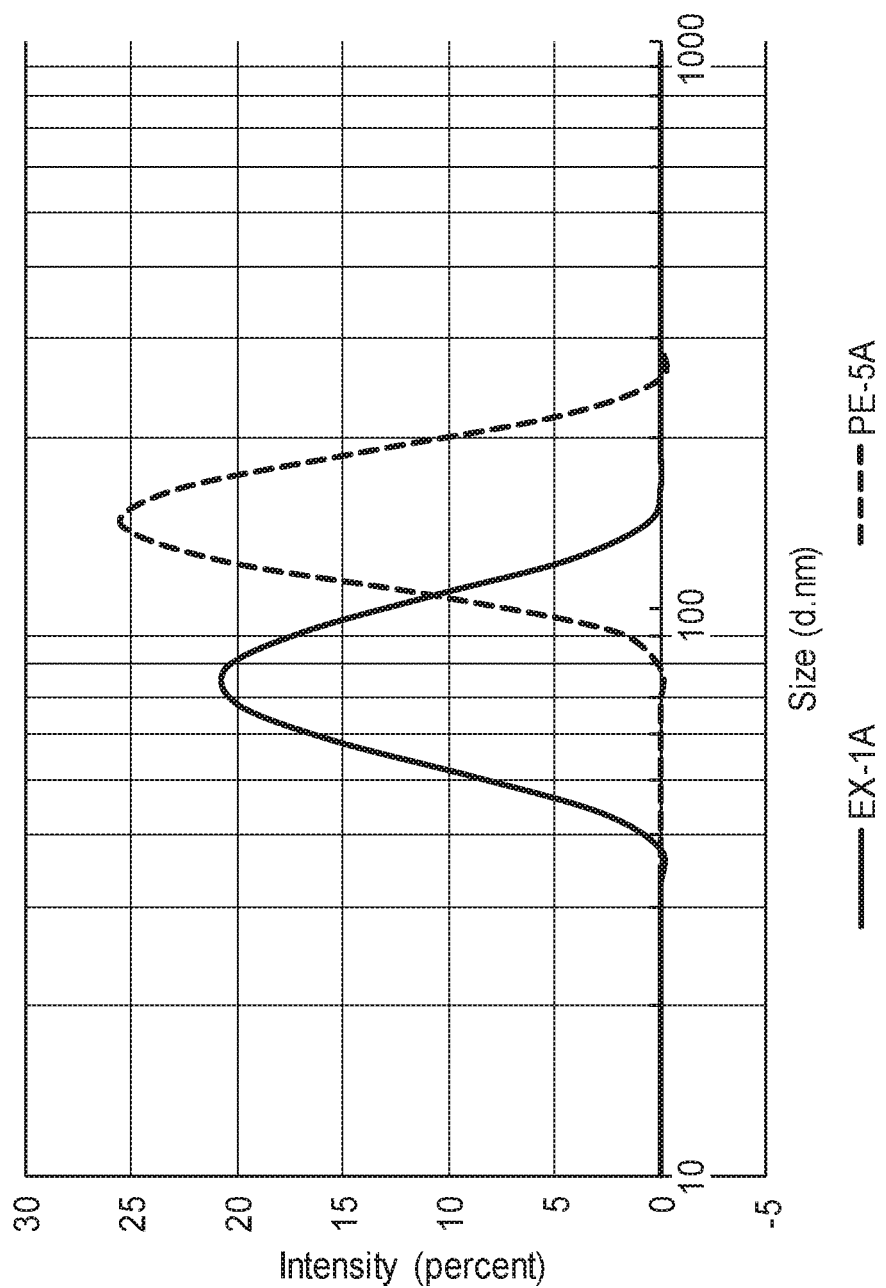
FIG. 1 is the dynamic light scattering data (NMP solvent) and compositional comparison of Example 1A and sample PE5A block copolymers.

The "B" block of the copolymer comprises polymeric units that form hard, glassy domains upon polymerization, with the B block having a $T_g$ of at least 50° C., preferably at least 70° C., and more preferably at least 90° C. The B block polymer domain comprises a total of 30 to 80 weight percent of the pentablock copolymer. The pentablock copolymers desirably have a polydispersity (PDI) of 1 to 5, preferably 1 to 3, more preferably 1 to 2.

The hard B blocks are typically selected from vinyl aromatic monomers and include, for example, styrene, α-methylstyrene, para-methylstyrene, 4-methylstyrene, 3-methyl styrene, 4-ethyl styrene, 3,4-dimethyl styrene, 2,4,6-trimethylstyrene, 3-tert-butyl-styrene, 4-tert-butyl styrene, 4-methoxystyrene, 4-trimethylsilylstyrene, 2,6-dichlorostyrene, vinyl naphthalene, and vinyl anthracene.

The nature and composition of the monomers which make up the individual C block is not particularly critical so long as the polymerized monomers provide a phase which meets the glass temperature requirement and, thus, can be described as "amorphous," "soft" or "rubbery." These terms are used interchangeably throughout the specification. It will be understood that "amorphous" blocks contain no or negligible amounts of crystallinity.

In particular embodiments, each block C is independently selected from the group consisting of polymerized (i) conjugated diene monomers, or (ii) a silicon polymer, and (iii) mixtures of monomers wherein segments containing polymerized conjugated diene monomers are optionally hydrogenated. Suitable conjugated dienes include, e.g., butadiene, isoprene, and the like, as well as 1,3-cyclodiene monomers, such as 1,3-cyclohexadiene, 1,3-cycloheptadiene and 1,3-cyclooctadiene, preferably 1,3-cyclohexadiene. When the C blocks of conjugated acyclic dienes such as butadiene or mixtures thereof are optionally hydrogenated, such blocks should have a vinyl content of from 0 to 40 mole percent post hydrogenation. C blocks resulting from hydrogenation include, but are not limited to, poly(ethylene-alt-propylene), poly(butylene), poly(ethylene-co-butylene), and poly(ethylene-co-propylene-co-butylene).

Additionally, the C blocks may be polymer blocks of silicon rubber segments, i.e., blocks of organopolysiloxanes having recurring units of —[Si($R^{10}$)$_2$—O]— wherein each $R^{10}$ denotes an organic radical, e.g., alkyl, cycloalkyl or aryl. Such blocks of organopolysiloxanes may be prepared by anionic polymerization of cyclic siloxanes of the general formula —[Si($R^{10}$)$_2$—O]$_r$—, where subscript r is 3 to 7. Cyclic siloxanes where subscript r is 3 or 4, and $R^{10}$ is methyl are preferred. Anionic polymerization of hexamethylcyclotrisiloxane monomer is generally described in Y. Yamashita et al. (for example, in Polymer J. 14, 913 (1982); ACS Polymer Preprints 25 (1), 245 (1984); Makromol. Chem. 185, 9 (1984).

The "C" block of the pentablock copolymer is substantially free of functional groups. Additionally, each of such blocks C may have a number average molecular weight of from about 1,000 to 200,000 and may have a glass transition temperature, $T_g$, of ≤20° C., preferably ≤0° C. The soft "C" block comprises a total of 10 to 40 weight percent of the pentablock block polymer. The combined B and C blocks comprise 70 to 95 weight percent of the pentablock polymeric units The A blocks comprise a copolymer block immiscible in the B and C blocks. The immiscible component of the copolymer shows multiple amorphous phases as determined, for example, by the presence of multiple amorphous glass transition temperatures using differential scanning calorimetry or dynamic mechanical analysis. As used herein, "immiscibility" refers to polymer components with limited solubility and non-zero interfacial tension, that is, a blend whose free energy of mixing is greater than zero: $\Delta G \cong \Delta H_m > 0$ Miscibility of polymers is determined by both thermodynamic and kinetic considerations. Common miscibility predictors for non-polar polymers are differences in solubility parameters or Flory-Huggins interaction parameters. For polymers with non-specific interactions, such as polyolefins, the Flory-Huggins interaction parameter can be calculated by multiplying the square of the solubility parameter difference with the factor (V/RT), where V is the molar volume of the amorphous phase of the repeated unit, R is the gas constant, and T is the absolute temperature. As a result, the Flory-Huggins interaction parameter between two non-polar polymers is always a positive number.

The A blocks are derived from ring-opening anionic polymerization of cyclic monomers or dimers selected from oxiranes (epoxides) to produce polyethers, cyclic sulfides to produce polythioethers, lactones and lactides to produce polyesters, cyclic carbonates to produce polycarbonates, lactams to produce polyamides and aziridines to produce polyamines. Polycarbonates may also be prepared by metal-catalyzed polymerization of carbon dioxide with epoxides listed previously (as described in Journal of the American Chemical Society, 2005, pg. 10869). The A blocks may have a linear or branched structure.

Useful epoxides include $C_2$-$C_{10}$, preferably $C_2$-$C_4$ alkyl epoxides. In particular ethylethoxy-glycidyl ether, ethylene, propylene, and butylene oxides. Another useful epoxide is glycidol, which can provide branched A blocks.

Suitable lactones and lactams are those having 3 to 12 carbon atoms in the main ring and are of the general formula:

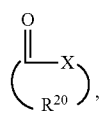

wherein
$R^{20}$ is an alkylene moiety that may be linear or branched having 1 to 20 carbon atoms, preferably 1 to 12 carbon atoms optionally substituted by catenary (in-chain) oxygen atoms, carbonyls or carboxylates; and X is —O— or $NR^1$—, where $R^1$ is $C_1$-$C_4$ alkyl. It will be appreciated that the cyclic lactones are derived from hydroxy acids including 3-hydroxybutyrate, 4-hydroxybutyrate, 3-hydroxyvalerate, lactic acid, 3-hydroxypropanoate, 4-hydropentanoate, 3-hydroxypentanoate, 3-hydroxyhexanoate, 3-hydroxyheptanoate, 3-hydroxyoctanoate, dioxanone, valerolactone, caprolactone, and glycolic acid. The lactams are derived from the corresponding amino acids. Dimers of the hydroxy acids, such as lactide may be used.

Useful lactams include 2-pyrrolidone, 2-piperidone, caprolactam, lauryllactam and mixtures thereof.

Useful cyclic carbonates include 5-membered to 7-membered cyclic carbonates. In embodiments, cyclic components comprise trimethylene carbonate, neopentyl glycol carbonate, 2,2,4-trimethy l-1,3-pentanediol carbonate; 2,2-dimethyl-1,3-butanediol carbonate, 1,3-butanediol carbonate, 2-methyl-1,3-propanediol carbonate, 2,4-pentanediol carbonate, 2-methyl-butane-1,3-diol carbonate, ethylene carbonate, and propylene carbonate.

Suitable cyclic anhydrides include, but are not limited to, aliphatic dicarboxylic anhydrides, such as, succinic anhydride, glutaric anhydride, maleic anhydride and combinations thereof.

Example of aziridine monomers comprise aziridine and its alkyl-substituted homologues.

Suitable cyclic ethers include 5-membered to 7-membered cyclic ethers. References to suitable ring-opening polymerizable monomers may be found in Frisch, Kurt Charles; Reegan, Sidney L; Ring-opening polymerization: Kinetics and mechanisms of polymer ration, Dekker Publishing, 1969 and in Su, Wei-Fang, Ring-Opening Polymerization in Principles of Polymer Design and Synthesis; Springer Berlin Heidelberg, pp. 267-299, 2013

Anionic polymerizations and copolymerizations include one or more polymerization initiators. Carbon-centered propagating anions will often require differing initiators from those used to produce oxygen-centered propagating anions.

Suitable initiators include alkali metal hydrocarbons such as alkyl or aryl lithium, sodium, or potassium compounds containing up to 20 carbon atoms in the alkyl or aryl radical or more, preferably up to 8 carbon atoms. Examples of such compounds are benzylsodium, ethylsodium, propylsodium, phenylsodium, butylpotassium, octylpotassium, benzylpotassium, benzyllithium, methyllithium, ethyllithium, n-butyllithium, sec-butyllithium, tert-butyllithium, phenyllithium, and 2-ethylhexyllithium. Lithium compounds are preferred as initiators.

Initiators particularly useful with specific monomers are well known in the art. Initiators compatible with the exemplary monomer systems discussed herein are summarized in Hsieh et al., Anionic Polymerization: Principles and Practical Applications, Ch. 5, and 23 (Marcel Dekker, New York, 1996).

Examples include, for example, alkyl lithium compounds such as s-butyllithium, n-butyllithium, tert-butyllithium, amyllithium and the like and other organo lithium compounds including di-initiators such as the di-sec-butyl-lithium adduct of m-diisopropenyl benzene and the tert-butyllithium adduct of 1-bis(phenyl)vinylbenzene. Further suitable di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and Re. 27,145

Molecular weight is determined by the initiator/monomer ratio, and thus the amount of initiator may vary from about 0.0001 to about 0.2 mole of organometallic initiator per mole of monomer. Preferably, the amount will be from about 0.002 to about 0.04 mole of initiator per mole of monomer. For the initiation of carbon-centered anionic polymerization, an inert preferably nonpolar organic solvent can be utilized. Anionic polymerization of cyclic monomers that yield an oxygen-centered anion and lithium cation require either a strong polar solvent such as tetrahydrofuran, dimethyl sulfoxide, or hexamethylphosphorous triamide, or a mixture of such polar solvent with nonpolar aliphatic, cycloaliphatic, or aromatic hydrocarbon solvent such as hexane, heptane, octane, cyclohexane, or toluene.

In one embodiment, the polymerization of monomers into the triblock polymer is initiated via addition of divalent anionic initiators that are known in the art as useful in the copolymerization of diene monomers and vinyl aromatic hydrocarbons. Such initiators can be selected from organic compounds comprising 2 lithium groups as represented by the formula:

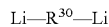

wherein $R^{30}$ is a divalent hydrocarbon group. $R^{30}$ generally contains 4 to 30 carbon atoms per $R^{30}$ group. Useful difunctional initiators are described in U.S. Pat. No. 7,884,160 (Wang et al.), and U.S. Pat. No. 5,750,055 (Van Der Steen et. al), incorporated herein by reference.

Other bi-functional anionic initiators include, but are not limited to, 1,4-dilithiobutane, 1,5-dilithiopentane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, and the like, and mixtures thereof.

Generally, the polymerization can be carried out at a temperature ranging from about −78° C. to about 100° C., preferably from about 0° C. to about 60° C. Anhydrous conditions and an inert atmosphere such as nitrogen, helium, or argon are typically required.

Termination of the anionic polymerization is, in general, achieved via direct reaction of the living polymeric anion with protic solvents. Termination with halogen-containing terminating agents, i.e., functionalized chlorosilanes, can produce, for example, vinyl-terminated polymeric monomers. Such terminating agents may be represented by the general formula $X—(Y)_n—Si(R)_{3-m}Cl_m$, where m is 1, 2, or 3 and where X, Y, n, and R have been previously defined. Preferred terminating agents are chlorotrimethylsilane or methacryloxypropyldimethylchlorosilane. The termination reaction is carried out by adding a slight molar excess of the terminating agent (relative to the amount of initiator) to the living polymer at the polymerization temperature.

It is recognized that transitioning from a carbon-centered propagating anion to an oxygen-centered propagating anion can be used as a method for terminating an anionic polymerization of vinyl aromatics or conjugated dienes. For example, addition of oxiranes like ethylene oxide to the styrenic anion produced during styrene polymerization can lead to end-capping of the polymer chain with a hydroxyl, oxygen-centered anionic functionality. The reduced nucleophilicity of the oxygen-centered anion prevents further polymerization of any vinyl aromatic or conjugated diene present, thus ethylene oxide acts as a terminating agent in one sense, yet also forms an initiator for further ring-opening polymerizations (as in Hsieh et al., Anionic Polymerization: Principles and Practical Applications, Ch. 5, and 23 (Marcel Dekker, New York, 1996)).

Functional anionic initiators can also be used to provide end-functionalized polymers. These initiators are typically suitable for initiating the recited monomers using techniques known to those skilled in the art. Various functional groups can be incorporated onto the end of a polymer chain using this strategy including: alcohol(s), thiol(s), carboxylic acid, and amine(s). In each of these cases, the initiator must contain protected functional groups that can be removed using post polymerization techniques. Suitable functional initiators are known in the art and are described in, e.g., U.S. Pat. No. 6,197,891 (Schwindeman et al.); U.S. Pat. No. 6,160,054 (Periera et al.); U.S. Pat. No. 6,221,991 (Letchford et al.); U.S. Pat. No. 6,184,338 (Schwindeman et al.); and U.S. Pat. No. 5,321,148 (Schwindeman et al.); each incorporated herein by reference.

These initiators contain tertiary alkyl or trialkylsilyl protecting groups that can be removed by post polymerization deprotection. Tert-alkyl-protected groups can also be removed by reaction of the polymer with para-toluenesulfonic acid, trifluoroacetic acid, or trimethylsilyliodide to produce alcohol, amino, or thiol functionalities. Additional methods of deprotection of the tert-alkyl protecting groups can be found in T. W. Greene and P. G. M. Wuts, Protective Groups in Organic Synthesis, Second Edition, Wiley, New York, 1991, page 41. Tert-butyldimethylsilyl protecting groups can be removed by treatment of the polymer with acid, such as hydrochloric acid, acetic acid, para-toluenesulfonic acid. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80-83.

In one embodiment, the present disclosure provides a method of preparing the pentablock comprising the steps of a) anionically polymerizing, with a functional initiator, the B block monomer (such as styrene), b) polymerizing the C block monomer, (such as isoprene), c) coupling the block copolymer formed in steps a) and b) with a coupling agent, deprotecting, and further polymerizing the coupled polymer of step c) with a ring-opening polymerizable monomer (such as ethylene oxide).

In this method the ends of the RO—BC—Li block copolymer is coupled to generate a RO—CBC—OR block copolymer with a coupling agent such that substantially each polymer chain has a residue of an initiator present on substantially each polymer chain end. The coupling agent is present in a minor proportion of the CBC polymer chain backbone. Suitable coupling agents include, in solution, dihalogenated compounds; diacid chlorides; diacid bromides; dichloro compounds; dibromosilanes and dichlorosilanes, and the di-functional compounds: bis-epoxides, bis-aziridines, bis-isocyanates, bis-anhydrides and diesters. Preferred coupling agents include terephthaloyl chloride, dichlorodimethylsilane, dichlorodiphenylsilane, 1,4-dibromobutene, α,α'-dibromoxylene, and m-bis(phenylethenyl) benzene (PEB).

The method may be illustrated as follows with styrene as the "B" monomer, isoprene as the "C" monomer, and a functional initiator. Styrene is anionically polymerized followed isoprene to yield an RO—BC—Li block copolymer intermediate having a carbon-centered lithium anion on one terminus and the residue of the functional initiator having a protected functional group on the other terminus. For example, if the functional initiator was t-butyldimethylsilylpropyl lithium (TBDMSPL), the residue is t-butyldimethylsilylpropyl. The intermediate is reacted with a coupling agents, such as α,α'-dibromoxylene, to produce an intermediate having the protected functional group on both termini. This intermediate may be deprotected, such as by reaction with fluoride ion. Using the TBDMSPL initiator, deprotection yields a hydroxyl group at the copolymer termini. This hydroxyl-functional copolymer may be reacted with the A monomer via ring-opening polymerization to provide the A blocks.

oxide or other oxirane, to monofunctionalize a terminus of the block copolymer to yield the intermediate shown. Deprotection of the functional group yields a difunctional, telechelic block copolymer, which may be reacted with additional A monomer to yield the pentablock copolymer.

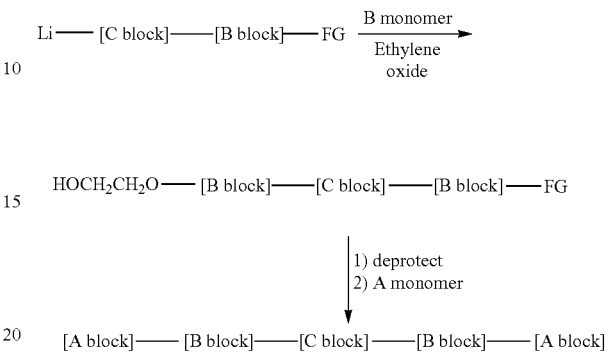

In another embodiment the anionic polymerization can be initiated with a difunctional initiator, with the C monomers, the B monomers and the A monomers.

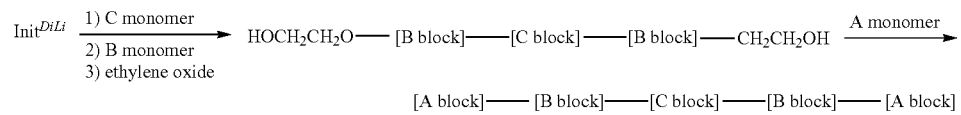

With each of the synthetic schemes it will be understood that some amount of A, B, C, BC, BCB, or ABC (co) polymers will also be present in the isolated (co)polymer blend. Generally greater than 50 wt. % of the resulting blend will be the pentablock copolymer, as determined by GPC and/or NMR.

The pentablock copolymer is melt-processible and can be melted or shaped, for example by extrusion or molding, to produce shaped articles, such as fibers, films and molded articles. By "melt-processible", it is meant that the copolymers are fluid or can be pumped or extruded at the temperatures used to process the articles (e.g. make the fine

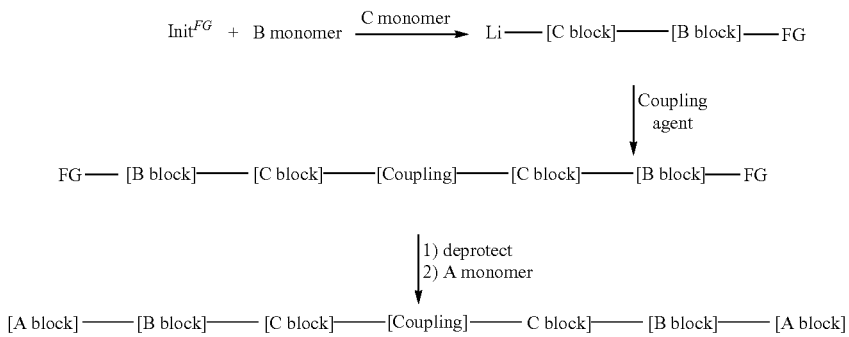

In another embodiment the functional initiator may be reacted with the B monomers, followed by the C monomers to produce the same Li-[C block]-[B block]-FG intermediate supra. This intermediate may then be reacted with a second quantity of B monomers, followed by a quantity of ethylene fibers in BMF), and do not degrade or gel at those temperatures to the extent that the physical properties are so poor as to be unusable for the intended application.

Shaped articles (e.g., fibers, films and molded or extruded articles) of this invention can be made, e.g., by melt extruding the pentablock copolymer into shaped articles such as pellets, fibers, or films by known methods. The pentablock polymer composition is especially useful in the preparation of nonwoven fabrics used in filtration applications. Films made from pentablock compositions are useful, for example, for packaging, release liners, and multilayer constructions.

After melt extrusion of a fiber, film or extruded article, an annealing step may be carried out to enhance migration of the A or B/C block to the surface with a resultant increase in hydrophilicity, tackiness, and/or adhesion. For example, the fiber or film is annealed at a temperature, under elevated humidity, and for a time sufficient to increase the amount of A block at the surface. Effective time and temperature will bear an inverse relationship to one another and a wide variety of conditions will be suitable.

The pentablock copolymer composition is also useful in preparing blown microfibers for non-woven fabrics having thermoelastic properties, hydrophilicity, toughness, and/or phase-separated features. The non-woven webs of fibers of pentablock copolymer may be prepared by any of the commonly known processes for producing non-woven webs. For example, the fibrous non-woven web can be made by spunbonding techniques or melt-blowing techniques or combinations of the two. Spunbonded fibers are typically small diameter fibers which are formed by extruding molten thermoplastic polymer as filaments from a plurality of fine, usually circular capillaries of a spinneret with the diameter of the extruded fibers being rapidly reduced. Meltblown fibers are typically formed by extruding the molten thermoplastic material through a plurality of fine, usually circular, die capillaries as molten threads or filaments into a high velocity, usually heated gas (e.g. air) stream which attenuates the filaments of molten thermoplastic material to reduce their diameter. Thereafter, the meltblown fibers are carried by the high velocity gas stream and are deposited on a collecting surface to form a web of randomly disbursed meltblown fibers The melt blown fibers can be prepared as described in Van Wente, A., "Superfine Thermoplastic Fibers," Industrial Engineering Chemistry, vol. 48, pp. 1342-1346 (1956) and in Report No. 4364 of the Naval Research Laboratories, published May 25, 1954, entitled "Manufacture of Super Fine Organic Fibers" by Van Wente et al. or from microfiber webs containing particulate matter such as those disclosed, for example, in U.S. Pat. No. 3,971,373 (Braun), U.S. Pat. No. 4,100,324 (Anderson) and U.S. Pat. No. 4,429,001 (Kolpin et al.).

Multilayer constructions of nonwoven fabrics enjoy wide industrial and commercial utility and include uses such as fabrics for medical gowns and drapes. The nature of the constituent layers of such multilayer constructions can be varied according to the desired end use characteristics, and can comprise two of more layers of melt-blown and spunbond webs in many useful combinations such as described in U.S. Pat. Nos. 5,145,727 and 5,149,576, incorporated herein by reference. The filtering efficiency of a melt-blown microfiber web can be improved by a factor of two or more when the melt-blown fibers are bombarded as they issue from the orifices with electrically charged particles such as electrons or ions, thus making the fibrous web an electret. Similarly, the web can be made an electret by exposure to a corona after it is collected.

Any of a wide variety of constructions, especially multilayer constructions such as SMS (spunbond/meltblown/spunbond) constructions, may be made from the above-described fibers and fabrics, and such constructions will find utility in any application where some level of hydrophobicity, oleophobicity (or other fluid repellency, such as to bodily fluids) is required. The fibers prepared from the pentablock copolymer composition of the invention may be used in woven and nonwoven medical fabrics (such as drapes, gowns and masks), industrial apparel, outdoor fabrics, and in myriad other related uses.

Films prepared from the composition of this invention can be made which are useful, for example, for packaging, release liners and microporous film applications. These films can be used to make multi-layer constructions in which one, more than one, or all layers contain the pentablock copolymer.

Figure 2:
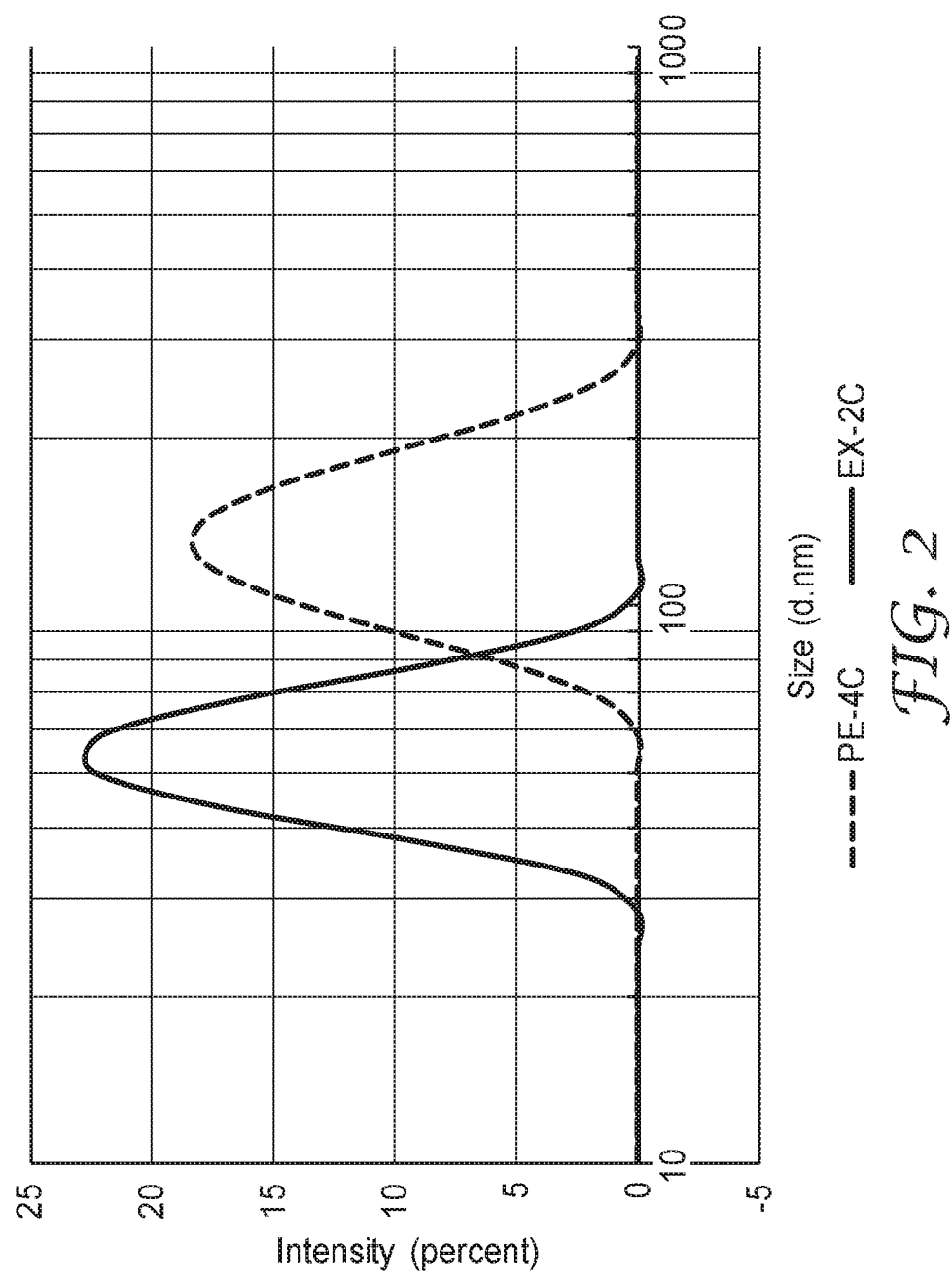
FIG. 2 is the dynamic light scattering data (NMP solvent) and compositional comparison of Example 2C and sample PE-4C block copolymers

Polymeric micro- and nanoparticles have also found commercial applications as dispersants and lubricants. For example, water-borne paints, adhesives, and coatings can benefit from the phase separation behavior of block copolymer-derived particles. While typically derived from emulsion polymerizations, anionically-derived block copolymers offer the benefit of less disperse materials which self-assemble to yield more uniform products. Product uniformity can impact film morphology and thus coating performance. Micelle formation of symmetric ABCBA block copolymers is, at present, found to be highly case dependent, with limited predictive capability. The added complication of aggregation (as described by Patel et. al in Protein Pept. Lett., 2014, 1185) further inhibits pentablock copolymer micelle prediction. The ABCBA pentablock copolymers detailed in this application yield the unexpected potential of generating tougher materials and smaller solution micelle sizes as compared to ABC triblock copolymers of analogous composition (FIGS. 1-3).

EXAMPLES

General Considerations:

Polymer synthesis and reagent purifications were conducted in a MBraun Labmaster SP glovebox or in custom glassware designed to enable anionic polymerizations (for examples see Ndoni, S.; Papadakis, C. M.; Bates, F. S.; Almdal, K. Laboratory-scale Setup for Anionic Polymerization under Inert Atmosphere. *Review of Scientific Instruments* 1995, 66 (2), 1090-1095 DOI: 10.1063/1.1146052). Standard air-free techniques were used for anionic polymerization and reagent manipulations. Reagents and corresponding suppliers are listed below in Table 1.

TABLE 1

Experiment materials, source and vendor product codes.
Materials

| Abbreviation or Trade Name | Product Code | Description |
|---|---|---|
| Isoprene | L14619 | Available from Alfa Aesar., Ward Hill, Massachusetts. |

TABLE 1-continued

Experiment materials, source and vendor product codes.
Materials

| Abbreviation or Trade Name | Product Code | Description |
|---|---|---|
| Styrene | S4972 | Reagent plus, >99%, available from Sigma-Aldrich Co. LLC., St. Louis, Missouri |
| TBDMSPL | — | Tert-butyl-dimethylsiloxy-propyl-1-lithium, 1.04M in cyclohexane, available from FMC Lithium. |
| Rac-lactide | M700 | Monomer available from NatureWorks LLC, Minnetonka, Minnesota. |
| Benzene | BX0212-6 | Omnisolv, available from EMD Millipore |
| Methylene Chloride | DX0831-1 | Omnisolv, available from EMD Millipore |
| THF | 401757 | Tetrahydrofuran, anhydrous, ≥99.9%, inhibitor-free. Available from Sigma-Aldrich Co. LLC., St. Louis, Missouri. |
| DBU | A12449 | 1,8-Diazabicyclo[5.4.0]undec-7-ene, 99%, available from Alfa Aesar, Ward Hill, Massachusetts. |
| TBAF | 216143 | Tetrabutylammonium Fluoride, 1.0M in THF, available from Sigma-Aldrich Co. LLC., St. Louis, Missouri. |
| Dibromoxylene | D44804 | α,α'-1,4-dibromoxylene, available from Sigma-Aldrich Co. LLC., St. Louis, Missouri |
| Ethylene Oxide | 387614 | Ethylene Oxide >=99.5%. Available from Sigma Aldrich Co. LLC., St. Louis, Missouri |
| Propylene Oxide | 110205 | 99%, Available from Sigma Aldrich Co. LLC., St. Louis, Missouri |
| Sec-butyllithium | 718-01 | 12 wt % sBuLi in cyclohexane, available from FMC Lithium |
| Di-n-butylmagnesium | 345113 | 1.0M in Heptane, available from Sigma Aldrich Co. LLC., St. Louis, Missouri |
| Methanol | MX0480-6 | Omnisolv, available from EMD Millipore |
| Potassium | 679909 | Potassium, cubes (in mineral oil), L × W × H 40 mm × 30 mm × 20 mm, 99.5% trace metals basis. Available from Sigma Aldrich Co. LLC., St. Louis, Missouri |
| Naphthalene | 33347 | Naphthalene, 99.6%. Available from Alpha Aesar, Ward Hill, Massachusetts. |
| Diphenylethylene | A14434 | 1,1-Diphenylethylene, 98%. Available from Alfa Aesar, Ward Hill, Massachusetts. |
| Tosyl Hydrazide | A13529 | 4-Methylbenzenesulphonylhydrazide, 98%, available from Alfa Aesar, Ward Hill, Massachusetts. |
| Tri-iso-butylaluminum | 423793 | 1.0M in hexanes, available from Sigma Aldrich Co. LLC., St. Louis, Missouri |
| P4 Base | 79421 | 1-tert-Butyl-4,4,4-tris(dimethylamino)-2,2-bis[tris(dimethylamino)-phosphoranylidenamino]-2$\lambda^5$,4$\lambda^5$-catenadi(phosphazene), Phosphazene base, 0.8M in hexanes. Available from Sigma Aldrich Co. LLC., St. Louis, Missouri |

Reagent Drying

Benzene was degassed by bubbling with Ar for longer than one hour before being cannula-transferred to a Strauss flask containing degassed 1,1-diphenylethylene. Sec-BuLi was then added under Ar counterflow via syringe, causing a very gradual color change from light yellow to deep, wine red over the course of an hour. After stirring overnight, benzene was vacuum transferred to an addition funnel. CH$_2$Cl$_2$ was dried over CaH$_2$, degassed with three freeze-pump-thaw cycles, and vacuum-transferred into a receiving flask. Styrene was stirred over CaH$_2$ overnight, degassed with three freeze-pump-thaw cycles, and then vacuum-transferred into a Schlenk bomb containing dried dibutyl-magnesium. After stirring overnight in an Ar atmosphere, styrene was again vacuum-transferred into a receiving flask to afford a final, dry monomer. Isoprene was dried as detailed above with sequential vacuum transfers from CaH$_2$ and dibutyl-magnesium. Rac-lactide was recrystallized from ethyl acetate and dried overnight under high vacuum.

Ethylene oxide was condensed in a receiving flask cooled with liquid nitrogen, degassed by at least three freeze-pump-thaw cycles taking care not to warm the ethylene oxide above its boiling point (10.7° C.), vacuum transferred to a flask containing n-butyllithium (solvent removed in vacuo) and stirred at 0° C. for at least 30 min, vacuum transferred to a second flask containing n-butyllithium (solvent removed in vacuo) and stirred at 0° C. for at least an additional 30 min, and finally vacuum transferred to a flame dried monomer flask suitable for connection to the polymerization reactor.

Ethoxy(ethyl)glycidylether (EEGE) was prepared as described by Frey et. al. (*J. Am. Chem. Soc.*, 2002, 124, 9698). Prior to use in polymerization, EEGE was dried over calcium hydride and degassed with three freeze-pump-thaw cycles. Dry EEGE was obtained by vacuum distillation off of calcium hydride.

All other chemicals were used as received.

GPC

Tetrahydrofuran (THF, stabilized with 250 ppm BHT) was used as solvent and mobile phase. Solutions of known concentration were prepared in glass scintillation vials; the target concentration was 5.0 mg/mL. The vials were swirled for at least 4 hours in order to allow dissolution. The solutions were then filtered using 0.2μ PTFE syringe filters. The GPC conditions were the following:

Instrument: Agilent 1260 LC
Column set: Agilent Plgel MIXED A, 300×7.5 mm I.D.
Agilent Plgel MIXED B, 300×7.5 mm I.D
Col. Heater: 40° C.
Mobile phase: THF, stabilized with 250 ppm BHT at 1.0 mL/min
Injection
volume: 40
Wyatt DAWN HELEOS-II 18 angle Light Scattering Detector (s): detector
Wyatt ViscoStar II viscometer detector
Wyatt Optilab rEX Differential Refractive Index (DRI) detector ASTRA 6 from Wyatt Technology Corporation was used for data collection and analysis. A narrow standard of polystyrene of 30 kg/mol was used for normalization of the light scattering detectors and for measuring the inter-detector volume.

Preparatory Example 1: Hydroxyl-Terminated Poly(Styrene-Isoprene-Styrene) Block Copolymer (HO—SIS—OH) Using a Coupling Agent In a glovebox, benzene (~550 mL) and styrene (33.32 g, 320 mmol) were added to 1 L Schlenk flask with stirbar. Under vigorous stirring, TBDMSPL (0.70 mL, 0.70 mmol) was rapidly injected with a syringe. The color of the reaction slowly changed color from colorless to orange over the course of 15 minutes. The polymerization was allowed to stir at room temperature in the glovebox for 48 hours. Isoprene (22.48 g, 330 mmol) was then added, causing the reaction to rapidly change color to pale yellow. The polymerization was stirred for an additional 24 hours over which time it became more viscous. Dibromoxylene (95 mg, 0.36 mmol) was dissolved in ~6 mL dry benzene. 24 hours after addition of isoprene, dibromoxylene solution was added in 100 uL aliquots over the course of 15 minutes. The color of the reaction gradually disappeared. The polymerization was stirred for 4 more hours before being fully quenched with degassed isopropanol.

Polymer was then dried under reduced pressure and redissolved in THF, TBAF (5.0 mL, 1.0 M in THF, 5 mmol) was then added and the polymer solution was stirred overnight. The next morning, 8 mL acetic acid was added to ensure protonation of the hydroxyl groups. 30 minutes later, polymer was isolated by filtration through silica gel followed by precipitation from cold methanol. Polymer was once again dried, dissolved, and precipitated for a total of 2 precipitations to afford a white solid.

Polymer composition was determined by $^1$H-NMR, polymer molecular weight and dispersity by GPC analysis.

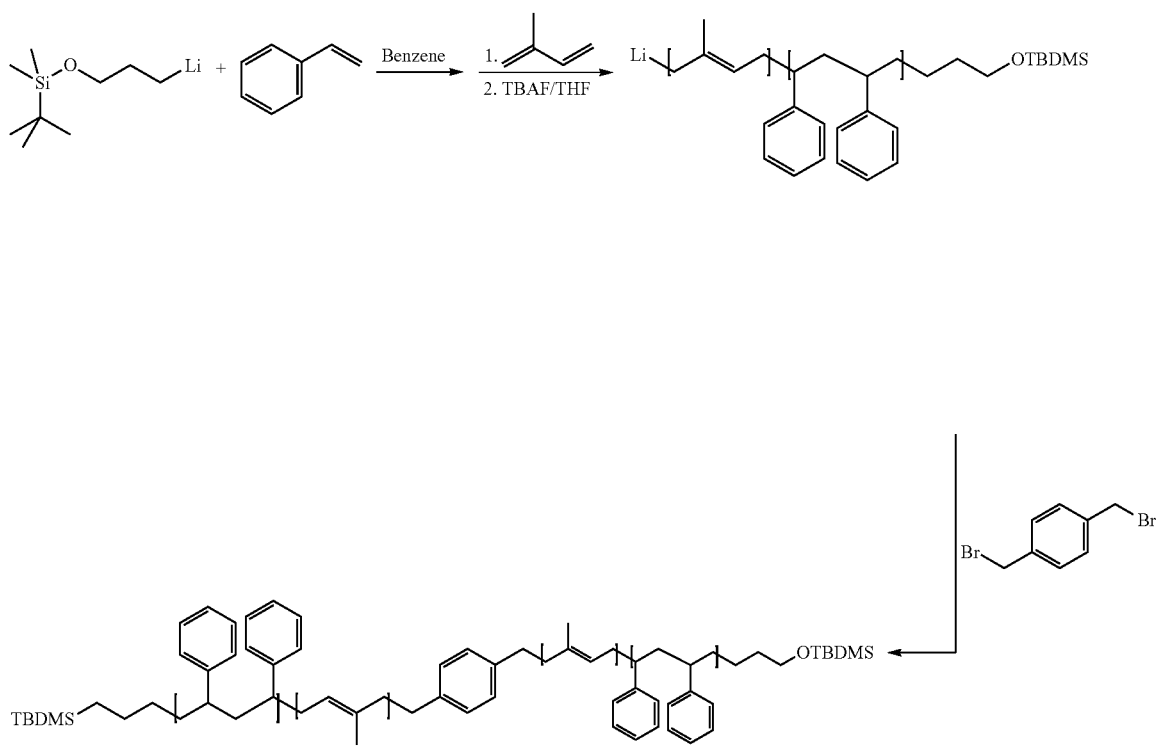

TABLE 2

Composition and GPC data for HO-SIS-OH samples prepared through use of a coupling agent.

| Sample ID | Mass % Isoprene | Mass % Styrene | GPC Mw (kg/mol) | GPC PDI |
|---|---|---|---|---|
| PE-1A | 31.5 | 68.5 | 90 | 1.07 |
| PE-1B | 35.4 | 64.6 | 100 | 1.04 |
| PE-1C | 39.6 | 60.4 | 127 | 1.25 |
| PE-1D | 36.8 | 63.2 | 187 | 1.28 |

Preparatory Example 2: Hydroxyl-Terminated Poly(Styrene-Isoprene-Styrene) Block Copolymer (HO—SIS—OH) Using Sequential Addition and Ethylene Oxide Termination

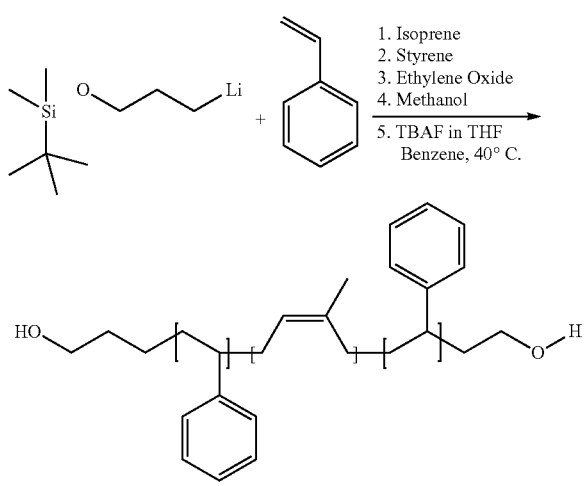

A 2 L polymerization reactor apparatus was constructed and inert Ar atmosphere established. 590 g of purified benzene was added to the reactor. TBDMSPL protected initiator (0.65 mL; nominally 0.65 mmol) was then added to the reactor and stirred for 30 minutes. Purified styrene (15.9 g, 153 mmol) was then added to the reactor. After reacting for approximately 1 hr at room temperature, the reactor was heated to 40° C. via a water bath. Approximately 24 hrs after the addition of styrene, 17.8 g (261 mmol) of isoprene was added to the reactor. Approximately 24 hrs after the addition of isoprene, 15.8 g (152 mmol) of styrene was added to the reactor. Approximately 24 hrs after the second addition of styrene, a large molar excess (2.4 g; 54 mmol) of ethylene oxide was added to the reactor resulting in a color change from orange to colorless. The reactor was then allowed to cool to room temperature. Approximately 16 to 96 hrs after the addition of ethylene oxide, the reaction was terminated with degassed methanol to yield a monohydroxyl end functional RO—SIS—OH triblock copolymer.

To yield a dihydroxyl terminal SIS triblock copolymer (HO—SIS—OH), benzene solvent was removed by rotary evaporation and the resulting polymer was dissolved in 400 mL of tetrahydrofuran. A 10× molar excess of TBAF relative to the initiator was added to the THF solution (6.5 mL of 1.0 M TBAF in THF; 6.5 mmol) and the solution was stirred at room temperature for at least 18 hrs. The THF solvent was removed by rotary evaporation and the resulting polymer was dissolved in 500 mL of dichloromethane. The dichloromethane solution was washed with several (at least 3) 300 mL aliquots of distilled water. The washed dichloromethane solution was precipitated in cold methanol and the resulting white solid was isolated by filtration and dried in vacuo to yield 46.4 g of dried polymer.

Polymer composition was determined by $^1$H-NMR, polymer molecular weight and dispersity by GPC analysis.

TABLE 3

Composition and GPC data for HO-SIS-OH prepared by sequential polymerization of styrene, isoprene, and styrene.

| Sample ID | Mass % Isoprene | Mass % Styrene | GPC Mw (kg/mol) | GPC PDI |
|---|---|---|---|---|
| PE-2A | 29.0 | 71.0 | 184 | 1.10 |
| PE-2B | 36.0 | 64.0 | 104 | 1.06 |
| PE-2C | 34.0 | 66.0 | 92 | 1.06 |
| PE-2D | 35.0 | 65.0 | 369 | 1.19 |
| PE-2E | 35.0 | 65.0 | 146 | 1.08 |
| PE-2F | 34.0 | 66.0 | 113 | 1.03 |

Preparatory Example 3: Hydroxyl-Terminated Poly(Styrene-Butadiene-Styrene) Block Copolymer (HO—SBS—OH) Using a Sequential Addition and Ethylene Oxide Termination

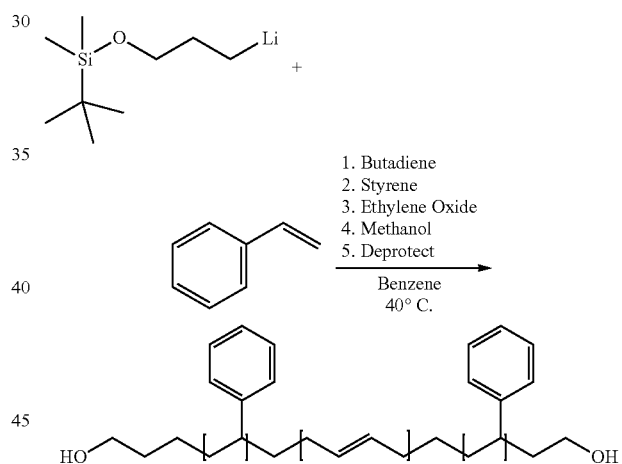

A 2 L polymerization reactor apparatus was constructed. The reactor was flame dried and an inert air and moisture free Ar atmosphere was established by repeated (at least 5) cycles of evacuation followed by refilling with Ar to a pressure of approximately 3 psig. 674 g of purified benzene was added to the reactor. TBDMSPL protected initiator (0.74 mL; nominally 0.74 mmol) was then added to the reactor and stirred for 30 minutes. 18.9 g (181 mmol) of purified styrene was then added to the reactor resulting in a gradual color change from colorless to orange of the course several minutes. After reacting for approximately 1 hr at room temperature, the reactor was heated to 40° C. via a water bath. Approximately 21 hrs after the addition of styrene, 19.4 g (359 mmol) of butadiene was added to the reactor resulting in an immediate color change from orange to pale yellow. Approximately 19 hrs after the addition of butadiene, 15.8 g (152 mmol) of styrene was added to the reactor resulting in an immediate color change from pale yellow to orange. Approximately 7 hrs after the second addition of styrene, a large molar excess (3 g; 68 mmol) of ethylene oxide was added to the reactor resulting in a color change from orange to colorless and the reactor was allowed to cool to room temperature. Approximately 72 hrs after the addition of ethylene oxide, the reaction was terminated with degassed methanol to yield a monohydroxyl end functional RO—SIS—OH triblock copolymer.

To yield a dihydroxyl terminal SBS triblock copolymer (HO—SBS—OH) and isolate the solid polymer the benzene solvent was removed by rotary evaporation and the resulting polymer was dissolved in 400 mL of tetrahydrofuran. A 10× molar excess of TBAF relative to the initiator was added to the THF solution (7.4 mL of 1.0 M TBAF in THF; 7.4 mmol) and the solution was stirred at room temperature for at least 18 hrs. The THF solvent was removed by rotary evaporation and the resulting polymer was dissolved in 500 mL of dichloromethane. The dichloromethane solution was washed with several (at least 3) 300 mL aliquots of distilled water. The washed dichloromethane solution was precipitated in cold methanol and the resulting white solid was isolated by filtration and dried in vacuo at 25° C. for at least 18 hrs followed by further drying in vacuo at 60° C. for at least 18 hrs to yield 51.1 g of dried polymer.

Polymer composition was determined by $^1$H-NMR, polymer molecular weight and dispersity by GPC analysis.

TABLE 4

Composition and GPC data for HO-SBS-OH prepared by sequential polymerization of styrene, butadiene, and styrene.

| Sample ID | Mass % Butadiene | Mass % Styrene | GPC Mw (kg/mol) | GPC PDI |
|---|---|---|---|---|
| PE-3A | 33.0 | 67.0 | 123 | 1.10 |

Preparatory Example 4: Hydroxyl-Terminated Poly(Isoprene-Styrene) Block Copolymer (IS—OH) Using a Sequential Addition and Ethylene Oxide Termination

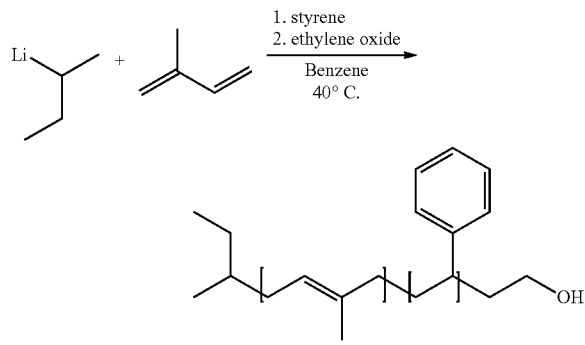

A 2 L polymerization reactor apparatus was constructed and inert Ar atmosphere established. Purified benzene (551 g) was added to the reactor and the reactor was heated to 40° C. via a water bath. Sec-butyllithium initiator solution (0.45 mL, 1.0 M in hexanes; nominally 68 mmol) was then added to the reactor and stirred for 30 minutes. Purified isoprene (21.1 g, 311 mmol) was added to the reactor. Approximately 24 hrs after the addition of isoprene, 38.9 g (373 mmol) of styrene was added to the reactor resulting in an immediate color change from pale yellow to orange. Approximately 24 hrs after the addition of styrene, a large molar excess (2 g; 45 mmol) of ethylene oxide was added to the reactor resulting in a color change from orange to colorless. The reactor was allowed to cool to room temperature. Approximately 16 to 96 hrs after the addition of ethylene oxide, the reaction was terminated with degassed methanol to yield a monohydroxyl end functional IS—OH diblock copolymer.

Polymer composition was determined by $^1$H-NMR, polymer molecular weight and dispersity by GPC analysis.

TABLE 5

Composition and GPC data for IS-OH prepared by ethylene oxide end-capping.

| Sample ID | Mass % Isoprene | Mass % Styrene | GPC Mw (kg/mol) | GPC PDI |
|---|---|---|---|---|
| PE-4A | 31.0 | 69.0 | 118 | 1.02 |
| PE-4B | 36.0 | 64.0 | 94 | 1.01 |

Preparatory Example 5: Preparation of Poly(Isoprene-Styrene-Ethyleneoxide) Block Copolymer (PI—PS—PEO) (ISO)

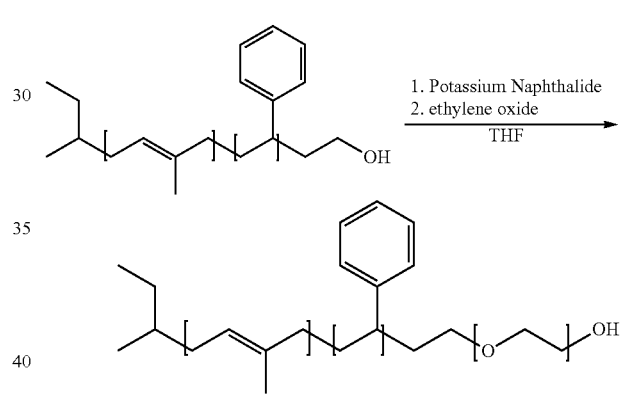

A 1 L polymerization reactor apparatus was constructed and inert Ar atmosphere established. IS—OH triblock copolymer (16.6 g, PE-XB) was dissolved in ~100 mL benzene and freeze-dried. Tetrahydrofuran (319 g) was added to the reactor. The reactor was stirred and heated to 45° C. to dissolve the polymer.

Potassium naphthalenide initiator solution was prepared by adding a 10% molar excess of naphthalene and dry tetrahydrofuran solvent to potassium metal. The solution was stirred under an Ar atmosphere for at least 24 hrs, resulting in a dark green solution.

Potassium naphthalenide initiator solution was slowly added to reactor until a pale green color persisted for at least 30 minutes, indicating the endpoint of the titration. 1.8 g (41 mmol) of ethylene oxide was then added to the reactor and the reaction was allowed to proceed for approximately 96 hrs prior to termination with degassed methanol.

To isolate the solid polymer the tetrahydrofuran solvent was removed by rotary evaporation and the resulting polymer was dissolved in 400 mL of dichloromethane and washed with several 400 mL aliquots of distilled water. The dichloromethane solvent was removed by rotary evaporation and the resulting polymer was redissolved in 150 mL of benzene and freeze dried to yield approximately 16 g of off-white polymer.

Polymer composition was determined by ¹H-NMR, polymer molecular weight and dispersity by GPC analysis.

TABLE 6

Composition and GPC data for ISO

| Sample ID | Precursor Polymer | Mass % Isoprene | Mass % Styrene | Mass % Ethylene oxide | GPC Mw (kg/mol) | GPC PDI |
|---|---|---|---|---|---|---|
| PE-5A | PE-4A | 25.6 | 57.8 | 16.6 | 142 | 1.05 |
| PE-5B | PE-4A | 26.0 | 58.7 | 15.4 | 139 | 1.02 |
| PE-5C | PE-4B | 32.8 | 59.1 | 8.2 | 101 | 1.02 |

Preparatory Example 6: Preparation of Poly(Isoprene-Styrene-D,L-Lactide) Block Copolymer (PI—PS—PLA)

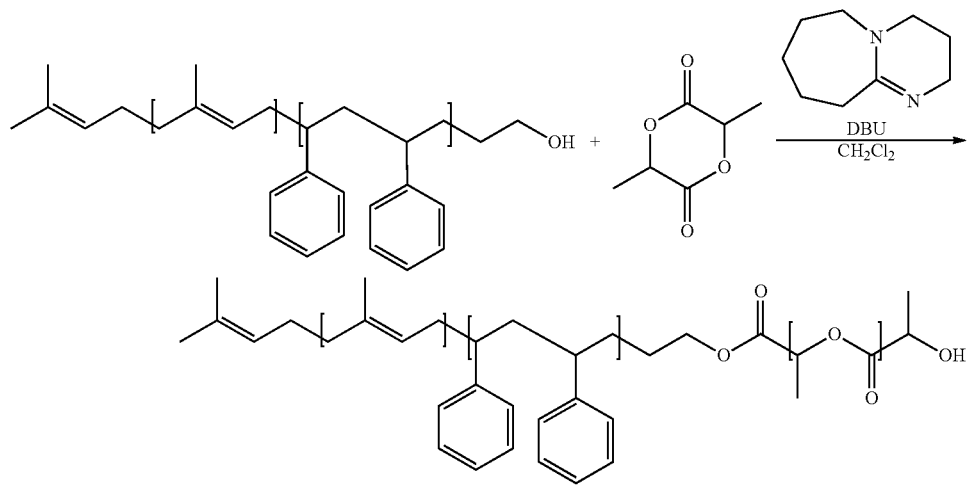

PI—PS—OH (Mw=104000, 38.6 mass % PI, 15.4 g, 0.148 mmol), rac-lactide (6.00 g, 41.6 mmol), and CH₂Cl₂ (103 mL) were added to a Schlenk bomb equipped with a stir bar. The contents were stirred until completely dissolved. Once dissolved, DBU (300 μL, 0.00202 mmol) was quickly added in conjunction with rapid agitation. The reaction was sealed, brought out of the glovebox, and placed on a stir plate. Over the course of 20 minutes, the viscosity reaction visibly increased. After 1 hour of reaction time, several large flakes of benzoic acid were introduced, and solvent was removed via rotary evaporation. The remaining solid was redissolved in minimal THF and the polymer precipitated from room temperature methanol. Precipitation was repeated from THF/methanol and a white solid was obtained. The polymer was dried overnight in a vacuum oven set at 60° C.

Polymer composition was determined by ¹H-NMR, polymer molecular weight and dispersity by GPC analysis.

TABLE 7

Preparatory Example 6 polymer composition.

| Sample ID | Mass % Isoprene | Mass % Styrene | Mass % L-Lactide | GPC $M_w$ (kg/mol) | GPC PDI |
|---|---|---|---|---|---|
| PE-6A | 29.0 | 48.7 | 22.3 | 129 | 1.15 |

Preparatory Example 7: Preparation of Poly[Styrene-(Ethylene-Alt-Propylene)-Styrene] Block Copolymer (HO—SEPS—OH)

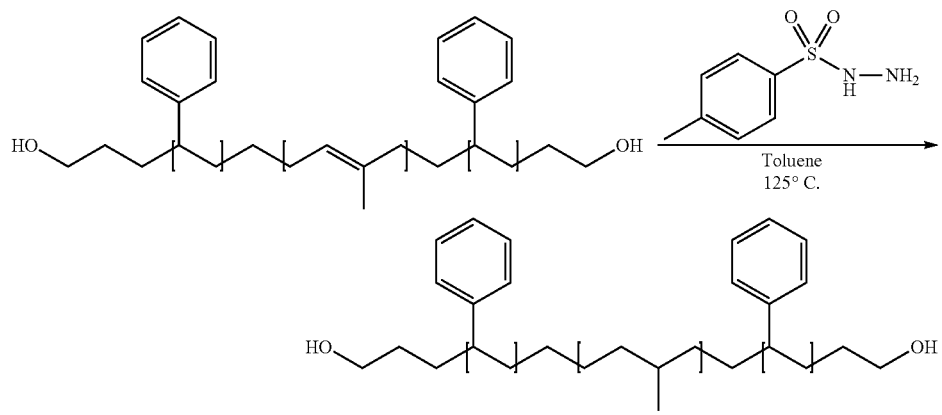

HO—SIS—OH (PE-2B, 10.8 g, 58.7 mmol double bonds), p-tosylhydrazide (45.0 g, 242 mmol), and toluene (~300 mL) were added to a 500 mL single-neck flask equipped with stirbar, reflux condensor and nitrogen inlet. The flask was placed in an oil bath and the oil bath heated to 90° C. for 1 hour. Once all of the tosylhydrazide had dissolved and a clear solution had formed, the reaction was heated to 120° C. and kept at that temperature for four hours. Once four hours had elapsed, the temperature of the oil bath was raised to 135° C. The solution was refluxed for three hours before heat was discontinued.

Toluene was then removed by rotary evaporation. Water (~200 mL) was added and the solid agitated to facilitate the removal of tosyl sulfinic acid. After the aqueous layer was decanted and discarded, the remaining white solid was redissolved in methylene chloride and washed with water once more. The organic phase was collected, dried with magnesium sulfate, and dried under rotary evaporation. The polymer residue was then dissolved in THF and twice precipitated from methanol. A white, stringy solid resulted.

Polymer composition was determined by $^1$H-NMR, polymer molecular weight and dispersity by GPC analysis.

TABLE 8

Preparatory Example 7 polymer composition.

| Sample ID | Mass % E-a-P | Mass % Styrene | GPC $M_w$ (kg/mol) | GPC PDI |
|---|---|---|---|---|
| PE-7 | 37.0 | 63.0 | 101 | 1.06 |

Example 1: Preparation of Poly(Lactide-Styrene-Isoprene-Styrene-Lactide) Block Copolymer (PLA-SIS—PLA)

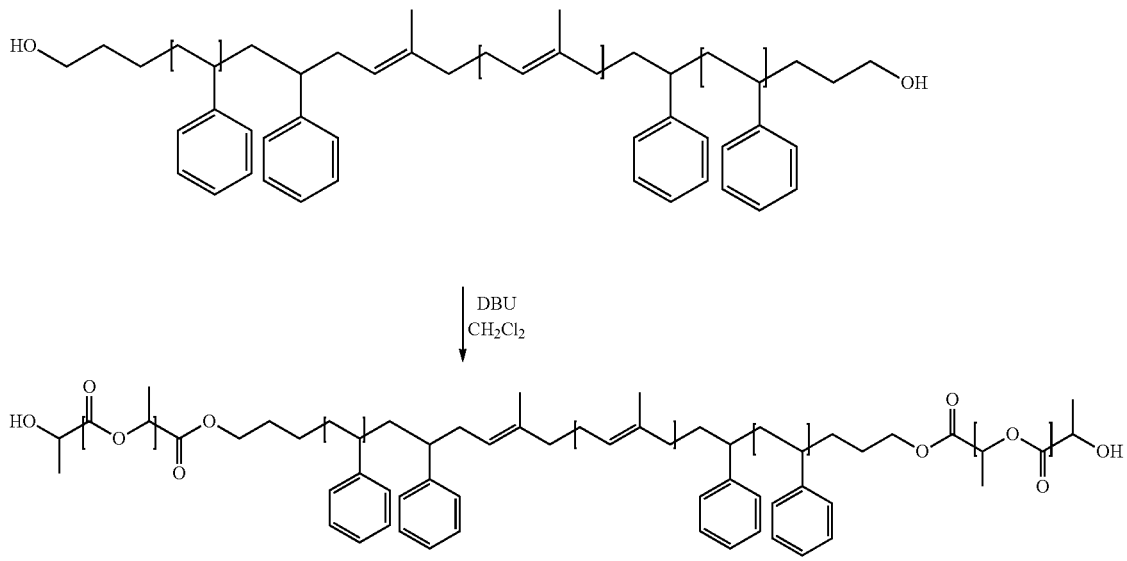

In a glovebox, methylene chloride (48.0 mL), rac-lactide (2.5 g), and HO—SIS—OH polymer (6.75 g, 104 kg/mol)) were stirred until completely dissolved (~2 hours). Once dissolved, DBU (45 µL) was quickly added in conjunction with rapid agitation. The reaction was sealed, brought out of the glovebox, and placed on a stirplate. The polymerization remained clear (not cloudy) during the course of the reaction. After 1 hour of reaction time, several large flakes of benzoic acid were introduced, and solvent was removed via rotary evaporation. The remaining solid was redissolved in minimal THF and the polymer precipitated from methanol. Precipitation was repeated from THF/methanol and a white solid was obtained. Polymer was dried in a vacuum oven overnight at 60° C.

Polymer composition was determined by $^1$H-NMR, polymer molecular weight and dispersity by GPC analysis.

TABLE 9

Composition and GPC data for LSISL pentablock materials.

| Sample ID | Precursor Polymer | Mass % Isoprene | Mass % Styrene | Mass % Lactide | GPC Mw (kg/mol) | GPC PDI |
|---|---|---|---|---|---|---|
| EX-1A | PE-1A | 24.3 | 52.8 | 23.9 | 119 | 1.19 |
| EX-1B | PE-1B | 28.3 | 56.3 | 15.4 | 107 | 1.17 |
| EX-1C | PE-1C | 26.8 | 47.6 | 25.6 | 166 | 1.36 |
| EX-1D | PE-1D | 31.0 | 49.0 | 20.0 | 279 | 1.55 |
| EX-1E | PE-2B | 27.5 | 47.0 | 25.5 | 132 | 1.08 |
| EX-1F | PE-2B | 31.0 | 53.0 | 16.0 | 116 | 1.13 |

Example 2: Preparation of Poly(Ethylene Oxide-Styrene-Isoprene-Styrene-Ethylene Oxide) Block Copolymer (OSISO)

A 1 L polymerization reactor apparatus was constructed and inert Ar atmosphere established. HO—SIS—OH triblock copolymer (19.2 g, PE-2A) was dissolved in ~100 mL benzene and freeze-dried. Tetrahydrofuran (628 g) was added to the reactor. The reactor was stirred and heated to 45° C. to dissolve the polymer.

Potassium naphthalenide initiator solution was prepared by adding a 10% molar excess of naphthalene and dry tetrahydrofuran solvent to potassium metal. The solution was stirred under an Ar atmosphere for at least 24 hrs, resulting in a dark green solution.

Potassium naphthalenide initiator solution was slowly added to reactor until a pale green color persisted for at least 30 minutes, indicating the endpoint of the titration. Ethylene oxide (5.8 g, 132 mmol) was added to the reactor and the reaction was allowed to proceed for approximately 96 hrs prior to termination with degassed methanol.

To isolate the solid polymer the tetrahydrofuran solvent was removed by rotary evaporation and the resulting polymer was dissolved in 400 mL of dichloromethane and washed with several (at least 3) 400 mL aliquots of distilled water. The dichloromethane solvent was removed by rotary evaporation and the resulting polymer was redissolved in 150 mL of benzene and freeze dried to yield approximately 19 g of off-white polymer.

Polymer composition was determined by $^1$H-NMR, polymer molecular weight and dispersity by GPC analysis.

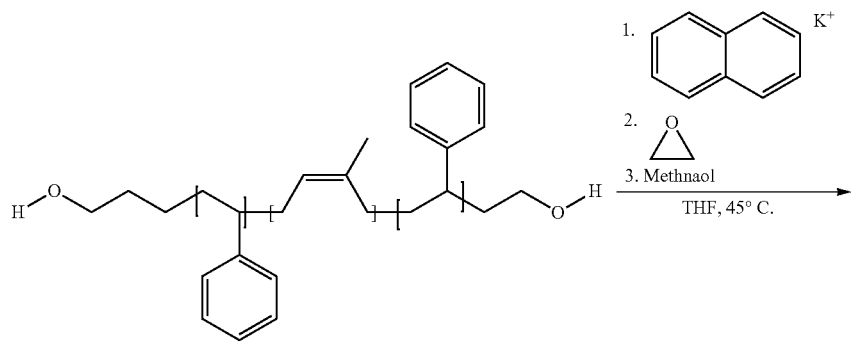

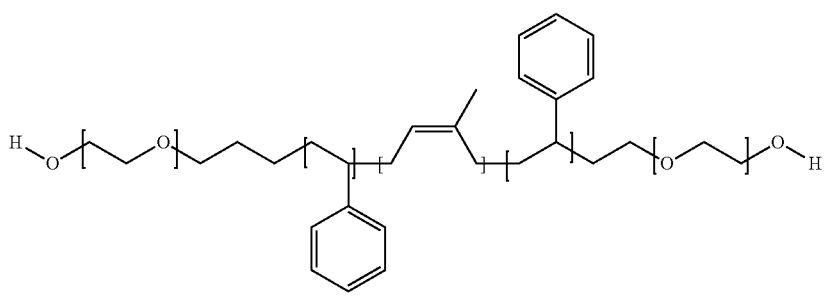

TABLE 10

Composition and GPC data for OSISO pentablock materials.

| Sample ID | Precursor Polymer | Mass % Isoprene | Mass % Styrene | Mass % Ethylene Oxide | GPC Mw (kg/mol) | GPC PDI |
|---|---|---|---|---|---|---|
| EX-2A | PE-2A | 24.0 | 58.0 | 18.0 | 225 | 1.10 |
| EX-2B | PE-2A | 23.0 | 56.0 | 21.0 | 230 | 1.08 |
| EX-2C | PE-2C | 31.6 | 60.7 | 7.7 | 99 | 1.05 |
| EX-2D | PE-2C | 30.0 | 58.0 | 12.0 | 109 | 1.07 |
| EX-2E | PE-2E | 30.0 | 55.0 | 15.0 | 175 | 1.09 |

Example 3: Preparation of Poly(L-Lactide-Styrene-Butadiene-Styrene-L-Lactide) Block Copolymer (LSBSL)

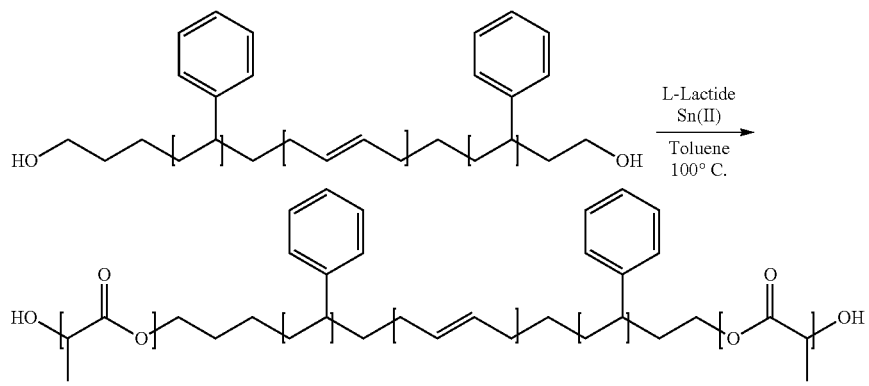

In a glovebox, 15 mL toluene and 2.0 g HO—SBS—OH polymer (PE-xA) were added to a glass thick walled pressure vessel and stirred until completely dissolved. Once dissolved, 1.3 g L-lactide (8.9 mmol) and 0.034 mmol Sn(II)ethylhexanoate were added to the reactor. The reaction was sealed, brought out of the glovebox, and placed in a 100° C. oil bath. The polymerization remained clear (not cloudy) during the course of the reaction. The reaction was quenched after 2 hours of reaction time by placing the reactor in an ice water bath. 50 mL of THF was added to dilute the polymer in the reaction solution. The polymer was precipitated in isopropanol, isolated by filtration through a glass frit, redissolved in minimal THF, reprecipitated in methanol, and again isolated by filtration through a glass frit. The polymer was then dried in a vacuum oven overnight at 60° C.

Polymer composition was determined by $^1$H-NMR, polymer molecular weight and dispersity by GPC analysis.

TABLE 11

Composition and GPC data for LSBSL pentablock materials.

| Sample ID | Precursor Polymer | Mass % Butadiene | Mass % Styrene | Mass % Lactide | GPC Mw (kg/mol) | GPC PDI |
|---|---|---|---|---|---|---|
| EX-3A | PE-3A | 23.0 | 48.0 | 29.0 | 168 | 1.17 |

Example 4: Preparation of Poly(Propyleneoxide-Styrene-Isoprene-Styrene-Propyleneoxide) Block Copolymer (PSISP)

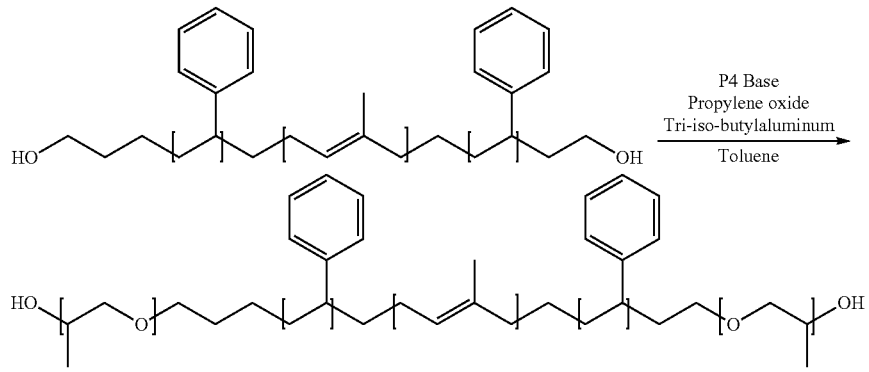

HO—SIS—OH triblock copolymer (15.0 g, PE-2D) was dissolved in ~100 mL benzene in a flask and freeze-dried. In a glovebox, 60 mL toluene was added to the flask and stirred until the PE-2D polymer completely dissolved. Once dissolved, 511 microliter of P4 phosphazene base solution (0.41 mmol) was added to the reaction flask and stirred for 30 minutes. 8 mL (111 mmol) of propylene oxide and 1.36 mL (1.36 mmol) triisobutyl aluminum solution was then added to the flask and the flask was sealed and allowed to stir at room temperature for 66 hrs. The polymerization was terminated with methanol To isolate the solid polymer the solvent was removed by rotary evaporation and the resulting polymer was dissolved in 300 mL of dichloromethane and washed with 400 mL of dilute hydrochloric acid followed by several 400 mL aliquots of distilled water. The dichloromethane solvent was removed by rotary evaporation and the resulting polymer was redissolved in 150 mL of benzene and freeze dried to yield a white polymer.

Polymer composition was determined by $^1$H-NMR, polymer molecular weight and dispersity by GPC analysis.

TABLE 12

Composition and GPC data for PSISP pentablock materials.

| Sample ID | Precursor Polymer | Mass % Isoprene | Mass % Styrene | Mass % Propylene oxide | GPC Mw (kg/mol) | GPC PDI |
|---|---|---|---|---|---|---|
| EX-4A | PE-2D | 48.0 | 25.0 | 27.0 | 137 | 1.06 |

Example 5: Preparation of Poly[(ethoxyglycidylether)-Styrene-Isoprene-Styrene-(Ethoxyglycidylether)] Block Copolymer (ESISE)

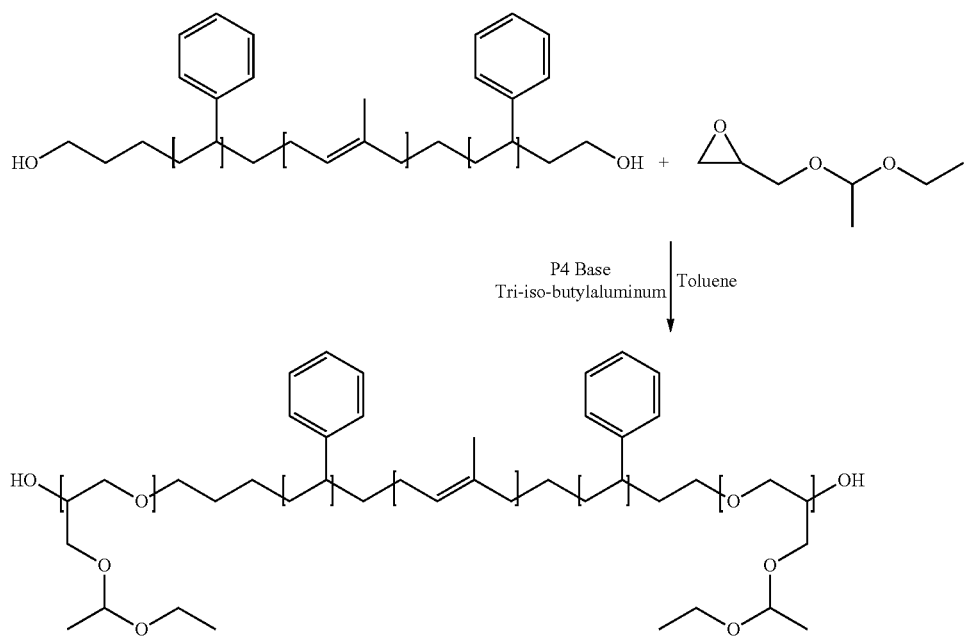

In the glovebox, dried polymer (16.8 g, 0.350 mmol —OH) was added to a 250 mL flask equipped with stirbar, ground-glass stopper and then dissolved in dry toluene (72 mL). Once polymer was dissolved, P4 base (0.8 M in hexanes, 525 uL, 420 mmol) was added, causing an immediate color change from colorless to yellow. After stirring for 40 minutes to allow for deprotonation, EEGE (12.6 mL) was added, resulting a slight color change to pale yellow. Tri-isobutylaluminum (1.0 M in hexanes, 840 uL, 840 mmol) was then added. The flask was capped and allowed to stir at room temperature for four days.

After four days, the polymerization had become opaque and milky. The reaction was quenched by addition of ~2 mL isopropanol, and the solvent removed under reduced pressure. Polymer was redissolved in ~50 mL THF before being precipitated from methanol. After two iterations of precipitation from THF/methanol, a dense white powder was obtained.

Polymer composition was determined by $^1$H-NMR, polymer molecular weight and dispersity by GPC analysis

TABLE 13

Composition and GPC data for ESISE pentablock materials.

| Sample ID | Precursor Polymer | Mass % Isoprene | Mass % Styrene | Mass % Glycidyl Ether | GPC Mw (kg/mol) | GPC PDI |
|---|---|---|---|---|---|---|
| EX-5A | PE-2C | 29.0 | 52.2 | 18.8 | 115 | 1.07 |

Example 6: Preparation of Poly[L-Lactide-Styrene-(Ethylene-Alt-Propylene)-Styrene-L-Lactide] Block Copolymer (LSEPSL)

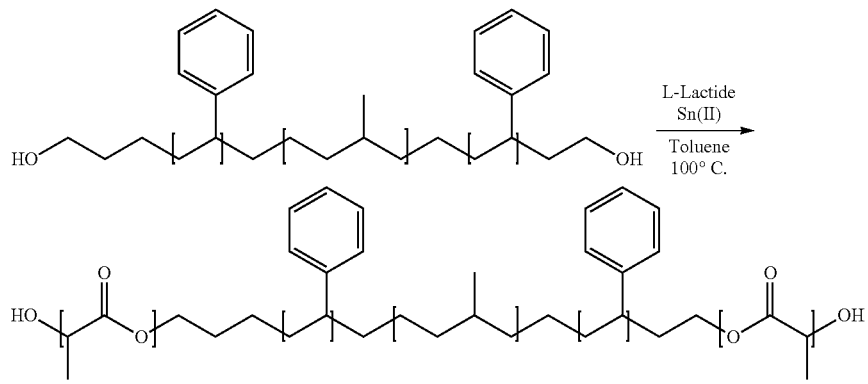

In the glovebox, HO—SEPS—OH (PE-XA, 4.0 g) was added to a 100 mL Schlenk bomb equipped with glass stirbar. Toluene (30.0 mL) was then added and the solution stirred until polymer was completely dissolved. L-lactide (2.6 g) was then added followed by addition of Sn(II) catalyst solution in toluene (134 uL, 18.2 mg tin(II) ethylhexanoate). L-Lactide is not appreciably soluble in room temperature toluene, so an otherwise clear suspension resulted.

The Schlenk bomb was then placed in an oil bath preheated to 105° C. After 2:00 hours, the Schlenk bomb was placed in an ice bath to halt further polymerization. The reaction was then precipitated from isopropanol to give a stringy white solid. The solid was dried, redissolved in ~30 mL THF, and precipitated once more from methanol. After drying overnight at 60° C. under high vacuum, NMR and GPC data were collected.

TABLE 14

Composition and GPC data for LSEPSL pentablock material.

| Sample ID | Precursor Polymer | Mass % E-a-P | Mass % Styrene | Mass % L-lactide | GPC Mw (kg/mol) | GPC PDI |
|---|---|---|---|---|---|---|
| EX-6 | PE-7 | 31.0 | 51.3 | 17.7 | 117 | 1.26 |

Dynamic Light Scattering

Dynamic light scattering (DLS) was performed using a Malvern Zetasizer. Solutions for DLS were prepared at 0.1 wt % polymer in ~4-5 mL NMP or DMF and allowed to sit at least 12 hours to dissolve. Copolymer solutions containing PEO were heated at 60° C. for at least an hour to allow crystalline domains to melt and equilibrate in the solution. The solutions were filtered through a 0.22 or 0.45 um PP syringe filter into a quartz cuvette for measurement. Measurements were taken at 25° C. after the sample had equilibrated for 2 minutes in the holder. The instrument software automatically optimized the measurement settings at 173° through adjustment of the measurement position and attenuator. Fitting was done using NMP or DMF as the dispersant. The intensity weighted mean hydrodynamic size (Z-Ave) and polydispersity (PDI) were calculated from a cumulants analysis of the measured correlation curve. All samples showed a single peak. See FIGS. 2 and 3 for graphic representation of ISO/OSISO and ISL/LSISL comparison.

TABLE 15

Dynamic light scattering data (DLS) comparison of relevant triblock and pentablock copolymers in NMP and DMF solvent.

| | Sample Name | Mn (kDa) | PEO/PLA fraction | Z-Ave (nm) | PdI |
|---|---|---|---|---|---|
| ISO/OSISO in NMP | PE-5A | 142 | 0.17 | 136 | 0.029 |
| | PE-5B | 139 | 0.15 | 119 | 0.013 |
| | PE-5C | 101 | 0.08 | 124 | 0.077 |
| | EX-2B | 230 | 0.21 | 145 | 0.106 |
| | EX-2A | 225 | 0.18 | 139 | 0.131 |
| | EX-2C | 99 | 0.08 | 53 | 0.017 |

TABLE 15-continued

Dynamic light scattering data (DLS) comparison of relevant triblock and pentablock copolymers in NMP and DMF solvent.

| | Sample Name | Mn (kDa) | PEO/PLA fraction | Z-Ave (nm) | PdI |
|---|---|---|---|---|---|
| ISL/LSISL in NMP | EX-1D | 280 | 0.20 | 121 | 0.053 |
| | EX-1E | 125 | 0.26 | 85 | 0.046 |
| | EX-1F | 120 | 0.16 | 81 | 0.06 |
| | EX-1A | 119 | 0.22 | 73 | 0.032 |
| | EX-1B | 107 | 0.14 | 88 | 0.013 |
| | PE-6A | 129 | 0.22 | 144 | 0.002 |
| ISL/LSISL in DMF | EX-1D | 280 | 0.20 | 124 | 0.075 |
| | EX-1E | 125 | 0.26 | 96 | 0.066 |
| | EX-1F | 120 | 0.16 | 104 | 0.141 |
| | EX-1A | 119 | 0.22 | 70 | 0.024 |
| | EX-1B | 107 | 0.14 | 85 | 0.055 |
| | PE-6A | 129 | 0.22 | 143 | 0.003 |

As an illustrative comparison, for the cases of ISO/OSISO in NMP, we observe dramatically different sizes for PE-5C (ISO) and EX-2C (OSISO) despite having very similar molecular weights and compositions (Table 15). In conjunction with tensile tests (see mechanical testing below), this data strongly suggests smaller features are accessible with significant improvements in final product toughness for pentablock amphiphiles versus triblock analogues. In comparing EX-2C with EX-2A, we see a 2.6× increase of micelle size.

Tensile Testing

Polymers were hot pressed into films 0.4-0.6 mm thick and cut into testing strips 4.5-6.5 mm wide and 2-4 inches long. Tensile measurements were performed on the samples using a 5544 Instron with a 500N load cell at a rate of 1 mm/min at ambient conditions. Three replicates were tested for each sample. Toughness was calculated by integrating the area under the true stress-true strain curves. Average toughness results are summarized in Table 16. The LSISL pentablock samples appear to be about two times tougher than the ISL triblock samples. The OSISO pentablock samples appear to be 1-2 orders of magnitude tougher than the ISO triblock samples.

TABLE 16

| Sample | Toughness [MJ/m$^3$] | Stddev [MJ/m$^3$] |
|---|---|---|
| PE-6A | 0.64 | 0.03 |
| EX-1D | 1.2 | 0.3 |
| EX-1E | 1.5 | 0.3 |
| PE-5B | —* | — |
| EX-2B | 0.6 | 0.2 |
| EX-2C | 5.4 | 0.7 |

*Measurement was on the order of experimental noise (<0.05 MJ/m$^3$).

What is claimed is:

1. A pentablock copolymer of the formula ABCBA wherein
   B is a vinyl aromatic block having a $T_g$ of ≥70° C. and comprising 30-80 wt. % of the copolymer;
   C is a rubber block having a $T_g$≤25° C. and comprising 10-40 wt. % of the copolymer; and
   A is a block derived from ring-opening polymerization, incompatible with both B and C blocks
   wherein B+C comprises 70-95 wt. % of the copolymer, and wherein the $M_n$ is >110 kDa.

2. The pentablock copolymer of claim 1 wherein C comprises 10-30 wt. % of the copolymer.

3. The pentablock copolymer of claim 1 wherein B is selected from styrene, α-methylstyrene, 4-methylstyrene, 3-methylstyrene, 4-ethylstyrene, 3,4-dimethylstyrene, 2,4,6-trimethylstyrene, 3-tert-butyl-styrene, 4-tert-butylstyrene, 4-methoxystyrene, 4-trimethylsilylstyrene, 2,6-dichlorostyrene, vinyl naphthalene, 4-chlorostyrene, 3-chlorostyrene, 4-fluorostyrene, 4-bromostyrene, and vinyl anthracene.

4. The pentablock copolymer of claim 1 wherein A is derived from ring-opening anionic polymerization of cyclic monomers selected from oxiranes (epoxides), cyclic sulfides, lactones, lactides, cyclic carbonates, lactams and aziridines.

5. The pentablock copolymer of claim 1 wherein the A block comprises polyesters selected from poly(lactic acid), poly(glycolic acid), poly(lactic-co-glycolic acid), polybutylene succinate, polyhydroxybutyrate, polyhydroxyvalerate, derived from ring opening polymerization of lactones.

6. The pentablock copolymer of claim 1 wherein the A block are polyethers selected from poly(ethylene oxide), poly(propylene oxide), poly(ethoxyethyl-glycidylether) and copolymers thereof derived from ring-opening polymerization of cyclic ethers.

7. The pentablock copolymer of claim 1 wherein B is derived from a vinyl aromatic monomers including styrene, vinylpyridine, vinyl toluene, alpha-methyl styrene, methyl styrene, dimethylstyrene, ethylstyrene, diethyl styrene, t-butylstyrene, di-n-butylstyrene, and isopropylstyrene.

8. The pentablock copolymer of claim 1 where A is derived from alternating copolymerization of carbon dioxide and oxiranes.

9. A method of preparing the pentablock of claim 1 comprising the steps of a) anionically polymerizing the C block monomer, b) polymerizing the B block monomer, c) coupling the block copolymer formed in steps a) and b) with a coupling agent, and further polymerizing the coupled polymer of step c) with a ring-opening polymerizable monomer.

10. The method of claim 9 wherein the coupling agent is selected from dihalogenated compounds; diacid chlorides; diacid bromides; dichloro compounds; dibromosilanes and dichlorosilanes, bis-epoxides, bis-aziridines, bis-isocyanates, bis-anhydrides and diesters.

11. A method of preparing the pentablock of claim 1 comprising the steps of a) anionically polymerizing the C block monomer with a functional anionic initiator, b) polymerizing the B block monomer, deprotecting the functional anionic initiator, and further polymerizing the coupled polymer of step c) with a ring-opening polymerizable monomer.

12. A method of preparing the pentablock of claim 1 comprising the steps of a) anionically polymerizing the C block monomer, with a difunctional anionic initiator, b) polymerizing the B block monomer, and further polymerizing the BCB copolymer of step b) with a ring-opening polymerizable A monomer.

13. A shaped article comprising the pentablock copolymer of claim 1.

14. The shaped article of claim 13 comprising films, sheet and fibers.

15. Polymer blends comprising the pentablock copolymer of claim 1 and an A, B, C, BC, BCB, or ABC (co)polymer.

16. The polymer blends of claim 15 wherein the pentablock copolymer comprises >50 wt. % of the polymer blend.

17. A pentablock copolymer of the formula ABCBA wherein

B is a vinyl aromatic block having a $T_g$ of ≥70°C. and comprising 30-80 wt.% of the copolymer;

C is a rubber block having a $T_g$ ≤25°C. and comprising 10-40 wt.% of the copolymer; and A is a block derived from ring-opening polymerization, incompatible with both B and C blocks wherein B+C comprises 70-95 wt.% of the copolymer, and wherein C is an organopolysiloxane having recurring units of)-[Si($R^{10}$)$_2$-O]- wherein each $R^{10}$ denotes an organic radical.

* * * * *